United States Patent
Shiimori et al.

(10) Patent No.: US 8,614,813 B2
(45) Date of Patent: Dec. 24, 2013

(54) RELAY SERVER FOR PRINT SERVICE AND METHOD OF CONTROLLING SAME

(75) Inventors: Yoshiko Shiimori, Tokyo (JP); Naoki Ikeya, Kawasaki (JP)

(73) Assignee: Fujifilm Corporation, Tokyo (JP)

( * ) Notice: Subject to any disclaimer, the term of this patent is extended or adjusted under 35 U.S.C. 154(b) by 1149 days.

(21) Appl. No.: 12/490,883

(22) Filed: Jun. 24, 2009

(65) Prior Publication Data
US 2009/0323110 A1 Dec. 31, 2009

(30) Foreign Application Priority Data

Jun. 25, 2008 (JP) ................................ 2008-166049

(51) Int. Cl.
*G06F 3/12* (2006.01)
*G06F 21/00* (2013.01)
*G06F 15/16* (2006.01)
*G06K 15/00* (2006.01)
*H04N 1/00* (2006.01)

(52) U.S. Cl.
USPC .......... 358/1.15; 358/1.16; 358/403; 358/407

(58) Field of Classification Search
None
See application file for complete search history.

(56) References Cited

U.S. PATENT DOCUMENTS

| 2004/0190049 A1* | 9/2004 | Itoh .............................. 358/1.15 |
| 2004/0257610 A1* | 12/2004 | Itoh et al. ..................... 358/1.15 |
| 2006/0221391 A1* | 10/2006 | Okazawa et al. ............ 358/1.15 |

FOREIGN PATENT DOCUMENTS

| EP | 1 331 549 A2 | 7/2003 |
| JP | 2002-014796 A | 1/2002 |
| JP | 2003-223291 A | 8/2003 |
| JP | 2003-280869 A | 10/2003 |
| JP | 2004-127282 A | 4/2004 |
| JP | 2004-220434 A | 8/2004 |
| JP | 2005-275515 A | 10/2005 |
| JP | 2006-155259 A | 6/2006 |
| KR | 2005-0093098 A | 9/2005 |

* cited by examiner

*Primary Examiner* — Thomas Lett
(74) *Attorney, Agent, or Firm* — Birch, Stewart, Kolasch & Birch, LLP

(57) ABSTRACT

File name data is transmitted from a mobile telephone to a relay server. The file specified by the file name data is read from a database and transmitted to a print service server. In response, a reservation code is transmitted from the print service server to the mobile telephone via the relay server. The user of the mobile telephone goes to a store where a printer has been installed and inputs the reservation code to the printer. The reservation code is transmitted from the printer to the print service server and the file corresponding to the reservation code is transmitted to and printed by the printer. Since the mobile telephone need only transmit the file name data in a case where printing is performed at the printer, data traffic through the mobile telephone is reduced.

8 Claims, 15 Drawing Sheets

Fig. 8

USER INFORMATION TABLE

| USER ID | NAME | MAIL ADDRESS | TERMINAL ID |
|---|---|---|---|
| USER0001 | ○YAMA○o | maruyama@keitai.ne.jp | Abcd01234 |
| USER0002 | ×KAWA×KO | batsukawa@keitai.ne.jp | Jklm56789 |
| ..... | ..... | ..... | ..... |
| | | | |

Fig. 9

RESERVATION INFORMATION TABLE

| RESERVATION CODE | SUBSCRIBER ID | FILE NAME | RESULT OF RESERVATION |
|---|---|---|---|
| 1 | USER0001 | WRITTEN ESTIMATE.doc | SUCCESS |
| 2 | USER0001 | REGISTRATION.txt | ERRER |
| 3 | USER0002 | NOTICE.doc | SUCCESS |
| ..... | ..... | ..... | ..... |

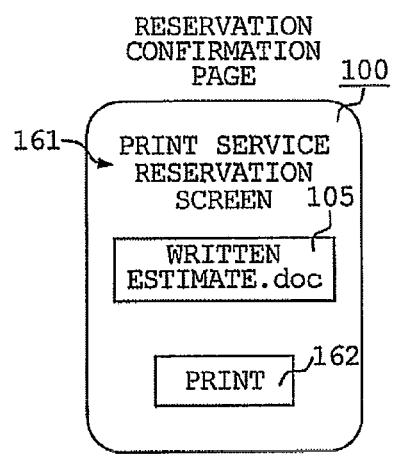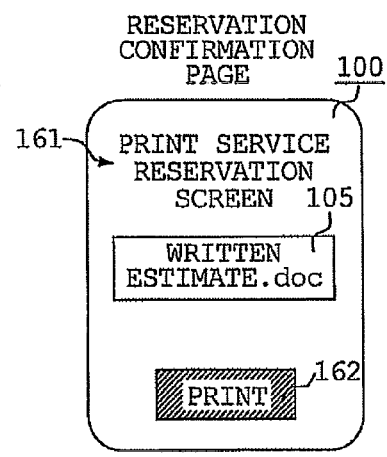

*Fig. 14*

```
LINE
  1   <documentinfo>
  2   <fileinfo>
  3       <filename>WRITTEN ESTIMATE.doc</filename>
  4       <filesize>650523</filesize>
  5   </fileinfo>
  6   <function>
  7       <permitprinting>true</permitprinting>
  8   </function>
  9   </documentinfo>
```

RELAY SERVER FOR PRINT SERVICE AND METHOD OF CONTROLLING SAME

BACKGROUND OF THE INVENTION

1. Field of the Invention

This invention relates to a relay server for a print service, a method of controlling the relay server and a control program for implementing the control method.

2. Description of the Related Art

User terminal devices such as mobile telephones have been adapted to enable viewing of high-resolution images, documents created on a personal computer, etc. A limitation, however, is that these devices cannot print on paper. For this reason, there is a technique that allows printing from a mobile telephone to a network service server over a network using a shop printer that has been installed in a convenience store (see the specification of Japanese Patent Application Laid-Open No. 2004-220434).

With such a system, often a file storage database in which files have been stored has a firewall formed between itself and a print service server that communicates with the printer. Often, therefore, a file is transmitted from the file storage database to the mobile telephone, then the file is transmitted from the mobile telephone to the print service server. Consequently, there are instances where the mobile telephone must handle a great deal of traffic.

SUMMARY OF THE INVENTION

Accordingly, an object of the present invention is to reduce the traffic of a mobile telephone.

According to the present invention, the foregoing object is attained by providing a relay server for a print service, comprising: a file name data receiving device for receiving file name data transmitted from a user terminal device and representing a file name; a file detecting device for finding a file, which has the file name represented by the file name data received by the file name data receiving device, from within a file storage database; a file transmitting device for transmitting the file detected by the file detecting device to a print service server that is incapable of accessing the file storage database, the print service server transmitting the received file to a printer and causing the printer to print contents represented by the file; a print reservation code receiving device for receiving a print reservation code transmitted from the print service server in response to transmission of the file to the print service server by the file transmitting device; and a print reservation code transmitting device for transmitting the print reservation code, which has been received by the print reservation code receiving device, to the user terminal device.

The present invention also provides a control method suited to the above-described relay server for a print service. Specifically the method comprises the steps of: receiving file name data transmitted from a user terminal device and representing a file name; finding a file, which has the file name represented by the received file name data, from within a file-storage database; transmitting the detected file to a print service server that is incapable of accessing the file-storage database, the print service server transmitting the received file to a printer and causing the printer to print contents represented by the file; receiving a print reservation code transmitted from the print service server in response to the transmission of the file to the print service server; and transmitting the received print reservation code to the user terminal device.

The present invention also provides a program executable by a computer processor for implementing the above-described control method.

In accordance with the present invention, data representing a file name is transmitted from a user terminal device and is received by relay server for a print service, whereupon the file having the file name represented by the file name data is detected in a file storage database. The detected file is transmitted to print service server, which cannot access the file storage database. When the file transmitted from the relay server for the print service is received by the print service server, the latter transmits a reservation code to the relay server for the print service. The reservation code is transmitted from the relay server for the print service to the user terminal device. When the user terminal device receives the reservation code, the user visits a convenience store or the like where a printer has been installed and inputs the reservation code to the printer. In response, the printer transmits the reservation code to the print service server and the file corresponding to the reservation code is transmitted from the print service server to the printer, which proceeds to print the file. Data representing the file name is transmitted from the user terminal device and can be printed in a system that performs printing utilizing a printer and a print service server incapable of accessing the file storage database.

The apparatus may further comprise a print reservation code transmitting device for transmitting the print reservation code, which has been received by the print reservation code receiving device, to the user terminal device.

The apparatus may further comprise a query command transmitting device, responsive to transmission of the file to the print service server by the file transmitting device, for transmitting a query command, which inquires as to whether receipt of the file succeeded or not, to the print service server until the print reservation code is received by the reservation code receiving device.

The apparatus may further comprise an acceptance data transmitting device for transmitting acceptance data, which indicates receipt of the file name data, to the user terminal device in response to receipt of the file name data by the file name data receiving device.

The apparatus may further comprise a determination device for determining whether contents represented by the file detected by the file detecting device cannot be printed in the printer utilizing the print service server; a file transmission halting device, responsive to a determination by the determination device that the contents cannot be printed, for halting transmission of the file to the print service server by the file transmitting device; and a print-halt alert data transmitting device, responsive to a determination by the determination device that the contents cannot be printed, for sending the user terminal device data indicating that printing has been halted.

The apparatus may further comprise a file format determination device for determining whether a format of the file detected by the file detecting device cannot be printed in the printer utilizing the print service server; and a format converting device, responsive to a determination by the file format determination device that the format cannot be printed, for converting the format of the file detected by the file detecting device to a format that can be printed in the printer utilizing the print service server. In this case, the file transmitting device would send the print service server a file having the format to which the conversion has been made by the format converting device.

The apparatus may further comprise a data-quantity determination device for determining whether data quantity of the file detected by the file detecting device is so great that it cannot be printed in the printer utilizing the print service server; and a data-quantity reducing device, responsive to a determination by the data-quantity determination device that the data quantity is so great that it cannot be printed, for reducing the data quantity of the file detected by the file detecting device to a data quantity capable of being printed in the printer utilizing the print service server. In this case, the file transmitting server would send the print service server a file having a data quantity the quantity of which has been reduced by the data-quantity reducing device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 8 and 9 are examples of a user information table and a reservation information table, respectively, according to a third embodiment of the present invention;

FIGS. 13A and 13B are examples of images displayed on the display screen of a mobile telephone according to the fourth embodiment;

FIG. 14 is an example of control information according to a fifth embodiment of the present invention;

DESCRIPTION OF THE PREFERRED EMBODIMENTS

Preferred embodiments of the present invention will now be described in detail with reference to the drawings.

Figure 1:
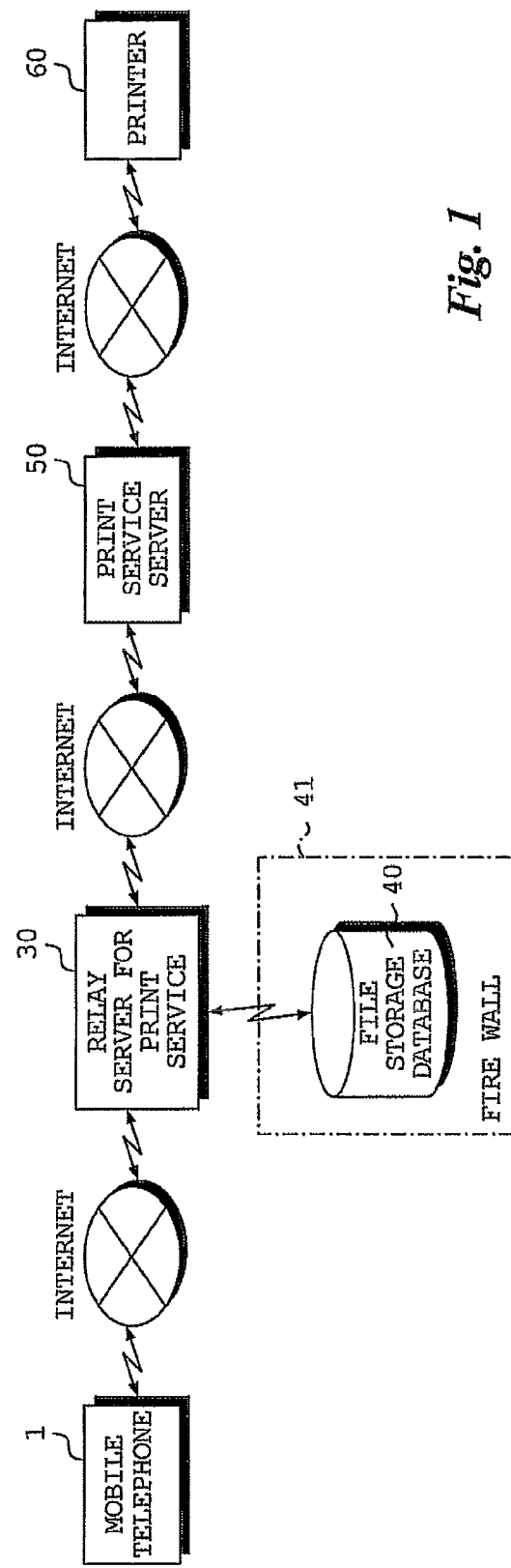
FIG. 1 illustrates an overview of a print service system according to an embodiment of the present invention.

FIG. 1 illustrates an overview of a print service system according to a first embodiment of the present invention.

The print service system includes a mobile telephone (user terminal device) 1, a relay server 30 for a print service, a file storage database 40, a print service server 50 and a printer 60.

The printer 60 is installed in a department store, convenience store, etc. A program for controlling operation, described later, has been installed in the relay server 30 for the print service.

The relay server 30 is capable of communicating with the mobile telephone 1 and print service server 50 via the Internet. The relay server 30 and file storage database 40 are managed by the same company and although the user of the mobile telephone 1 generally is a person who also belongs to this company, the user of the mobile telephone 1 need not necessarily belong to this company. Although the file storage database 40 is formed to have a firewall 41, it is possible for the relay server 30 and mobile telephone 1 to access the file storage database 40.

The print service server 50 is capable of communicating with the relay server 30 and can also communicate with the printer 60 via the Internet. The print service server 50 and printer 60 are managed by a company different from the company that manages the relay server 30 and file storage database 40 as mentioned above. Since the file storage database 40 has been formed to have the firewall 41, the print service server 50 cannot access the file storage database 40.

In the print service system according to this embodiment, the user of the mobile telephone 1 accesses the file storage database 40 using the mobile telephone 1 (password authentication, etc., is performed since the file storage database 40 has been formed to have the firewall 41) and acquires file name data representing the file name of a file representing contents (a document, image, etc.) to be printed. The file name data acquired is transmitted from the mobile telephone 1 to the relay server 30 for the print service. In response, the relay server 30 reads the file, which is specified by this file name data, from the file storage database 40. The read file is transmitted to the print service server 50.

A unique reservation code is issued and the issued reservation code is stored in correspondence with the file in the print service server 50. The reservation code is transmitted from the print service server 50 to the mobile telephone 1 via the relay server 30 for the print service. The user of the mobile telephone 1 goes to the convenience store, etc., where the printer 60 has been installed and inputs the received reservation code. When this is done, the printer 60 transmits the reservation code to the print service server 50. The file corresponding to the reservation code is transmitted to and printed by the printer 60. In accordance with this embodiment, since the mobile telephone 1 need only transmit file name data and not the file, a lower communication charge for the mobile telephone 1 suffices. Further details will be apparent from the description that follows.

Figure 2:
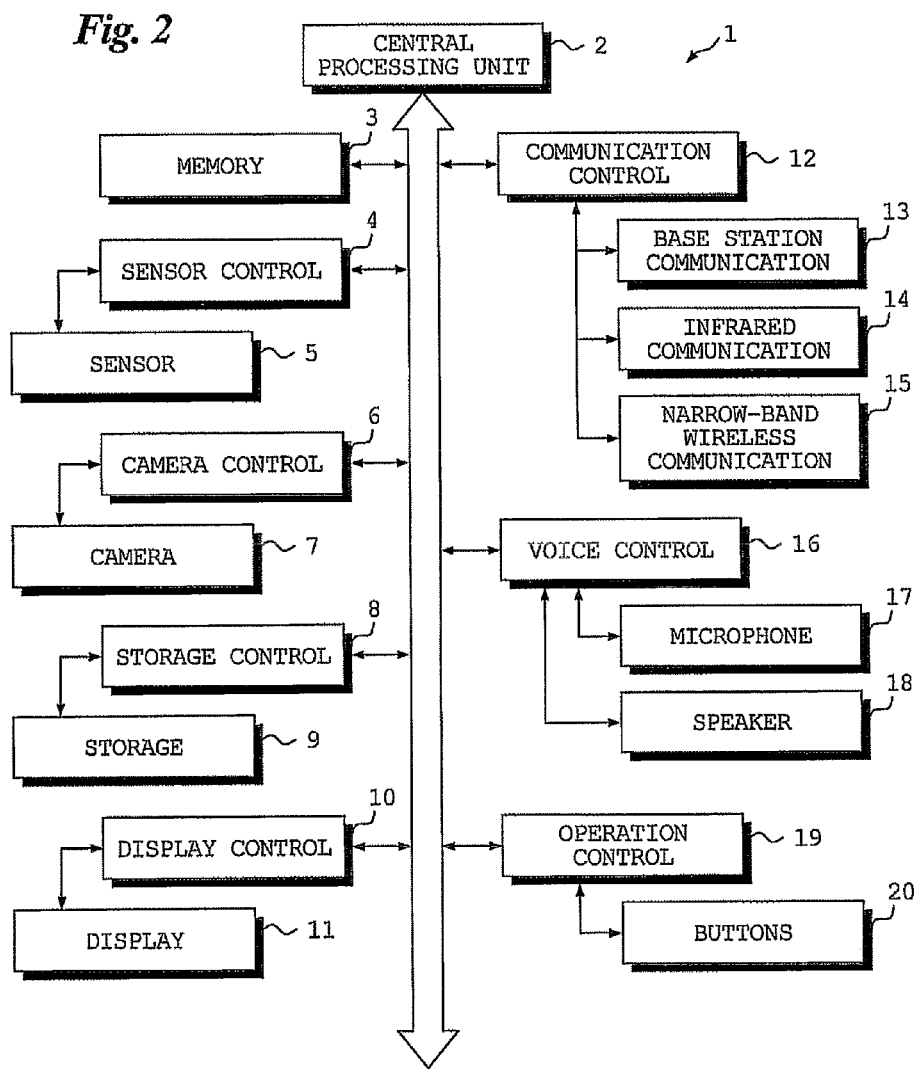
FIG. 2 is a block diagram illustrating the electrical configuration of a mobile telephone.

FIG. 2 is a block diagram illustrating the electrical configuration of the mobile telephone 1.

The overall operation of the mobile telephone 1 is controlled by a central processing unit 2.

The mobile telephone 1 includes a memory 3 for storing prescribed data and the like; a sensor 5; a sensor control unit 4 for controlling the sensor 5; a digital camera 7; a digital camera control unit 6 for controlling the digital camera 7; a storage device 9; a storage control unit 8 for controlling the storage device 9; a display device 11; and a display control unit 10 for controlling the display device 11. The mobile telephone 1 further includes a base station communication unit 13, an infrared communication unit 14 and a narrow-band wireless communication unit 15. The mobile telephone 1 further includes a communication controller 12 for controlling the communication units 13 to 15. The mobile telephone 1 further includes a microphone 17; a speaker 18; a voice control unit 16 for controlling the microphone 17 and speaker 18; buttons 20; and an operation control unit 19 for controlling the buttons 20.

Figure 3:
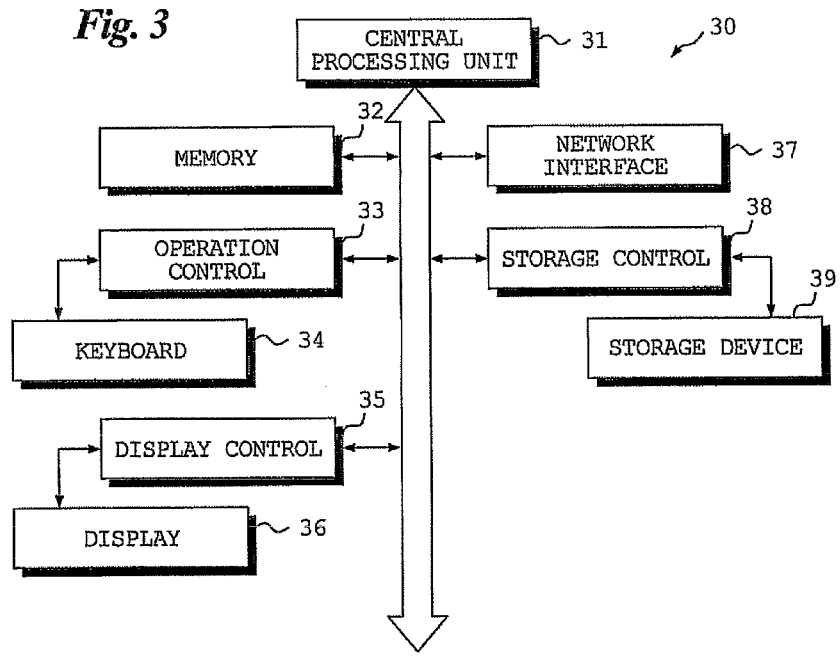
FIG. 3 is a block diagram illustrating the electrical configuration of a relay server for a print service system.

FIG. 3 is a block diagram illustrating the electrical configuration of the relay server 30 for the print service. The print service server 50 has substantially the same construction as that of the relay server 30.

The overall operation of the relay server is controlled by a central processing unit 31.

The relay server 30 includes a memory 32 for storing data and files, etc., temporarily; a keyboard 34; an operation control unit 33 for controlling the operation of the keyboard 34; a display device 36; a display control unit 35 for controlling the display device 36; a network interface 37 for connecting to the Internet; a storage device 39; and a storage control unit 38 for controlling the storage device 39.

Figure 4:
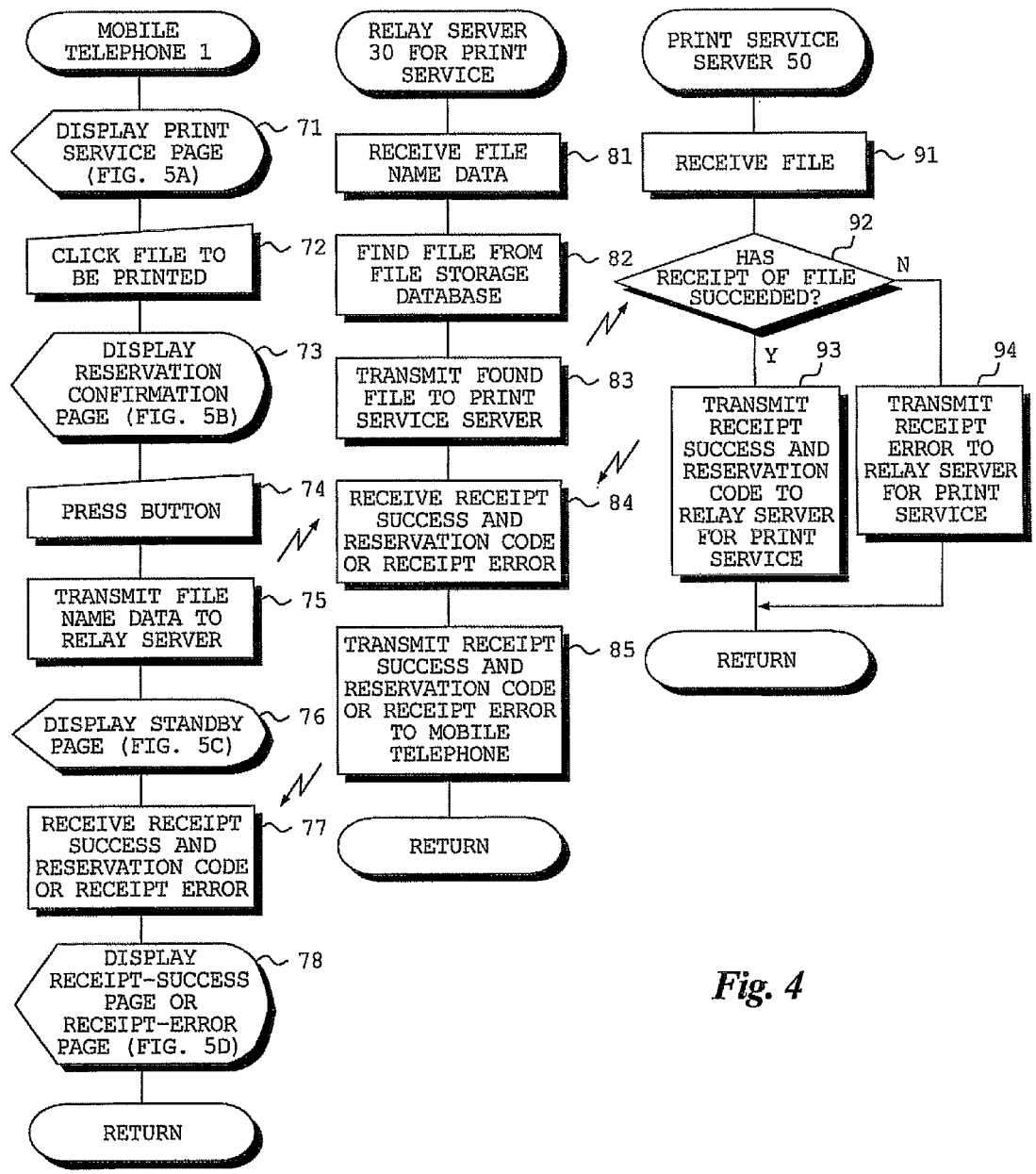
FIG. 4 is a flowchart illustrating processing executed by a print service system.

FIG. 4 is a flowchart illustrating processing executed by the mobile telephone 1, relay server 30 for the print service and print service server 50. FIGS. 5A to 5D are examples of images displayed on the display screen of the display device 11 of mobile telephone 1.

Figure 5:
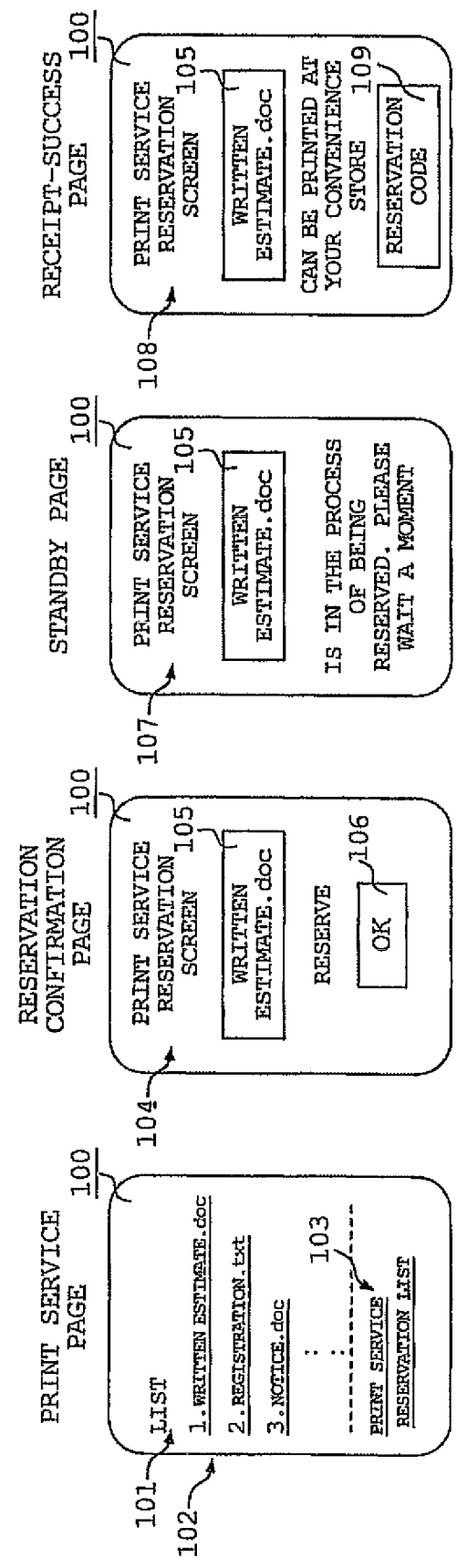
FIGS. 5A to 5D are examples of images displayed on the display screen of a mobile telephone.

When the mobile telephone 1 accesses the relay server 30 for the print service, a print service page 101 of the kind shown in FIG. 5A is displayed on display screen 100 of the mobile telephone 1 (step 71 in FIG. 4).

With reference to FIG. 5A, a file name list 102 of files that have been stored in the file storage database 40 is displayed on the print service page 101 displayed on the display screen 100. The file names displayed in the file name list 102 are clickable. A character string 103 reading "PRINT SERVICE RESERVATION LIST", which is clicked when reserved print contents are to be checked, is displayed below the file name list 102.

If any file name in the file name list 102 is clicked by the user of the mobile telephone 1 (step 72 in FIG. 4), a reservation confirmation page 104 illustrated in FIG. 5B is displayed on the display screen 100 of mobile telephone 1 (step 73 in FIG. 4).

With reference to FIG. 5B, a reserved file name display area 105 is formed substantially at the central portion of the reservation confirmation page 104. A file name clicked by the user of the mobile telephone 1 is displayed in the reserved file name display area 105. An OK area 106 is formed below the reserved file name display area 105. The OK area 106 is clicked if the contents represented by the file having the file name being displayed in the reserved file name display area 105 are acceptable for printing (step 74 in FIG. 4). If this is done, the data representing the file name being displayed in the reserved file name display area 105 is transmitted to the relay server 30 for the print service from the mobile telephone 1 (step 75 of FIG. 4). A standby page 107 shown in FIG. 5C is displayed on the display screen 100 of the mobile telephone 1 (step 76).

With reference to FIG. 5C, the reserved file name display area 105 is displayed substantially at the central portion of the standby page 107. A character string reading "PLEASE WAIT A MOMENT" is displayed below the reserved file name display area 105. By viewing the standby page 107, the user can confirm that reservation processing is in progress.

With reference to FIG. 4, when the file name data transmitted from the mobile telephone 1 is received by the relay server 30 for the print service (step 81), the file having the file name represented by the received file name data is found from the file storage database 40 (step 82). When the file is found, the found file is transmitted from the relay server 30 to the print service server 50 (step 83).

When the file transmitted from the relay server 30 is received by the print service server 50 (step 91), a reservation code is issued in association with the received file. The issued reservation code and the received file are stored in the print service server 50 in correspondence with each other. If receipt of the file succeeds ("YES" at step 92), then data indicating the fact that receipt has succeeded and the reservation code are transmitted to the relay server 30 (step 93). If receipt of the file does not succeed (or if issuance of the reservation code does not succeed) ("NO" at step 92), then receipt-error data is transmitted to the relay server 30 for the print service (step 94).

Upon receiving the receipt-success data and reservation code or the receipt-error data transmitted from the print service server 50 (step 84), the relay server 30 transmits the received data to the mobile telephone 1.

Upon receiving the receipt-success data and reservation code or the receipt-error data transmitted from the relay server 30 (step 77), a receipt-success page or receipt-error page shown in FIG. 5D is displayed on the display screen 100 of mobile telephone 1 (step 78).

FIG. 5D is one example of a receipt-success page 108.

The reserved file name display area 105 is displayed substantially at the central portion of the receipt-success page 108. Displayed below the reserved file name display area 105 is the fact that the contents of the file name being displayed in the reserved file name display area 105 can be printed using the printer installed in the convenience store. Furthermore, a reservation code area 109 is formed at the bottom of the display screen 100. By pressing the reservation code area 109, the reservation code is displayed on the display screen 100. The user of the mobile telephone 1 can perform printing using the reservation code displayed.

Figure 6:
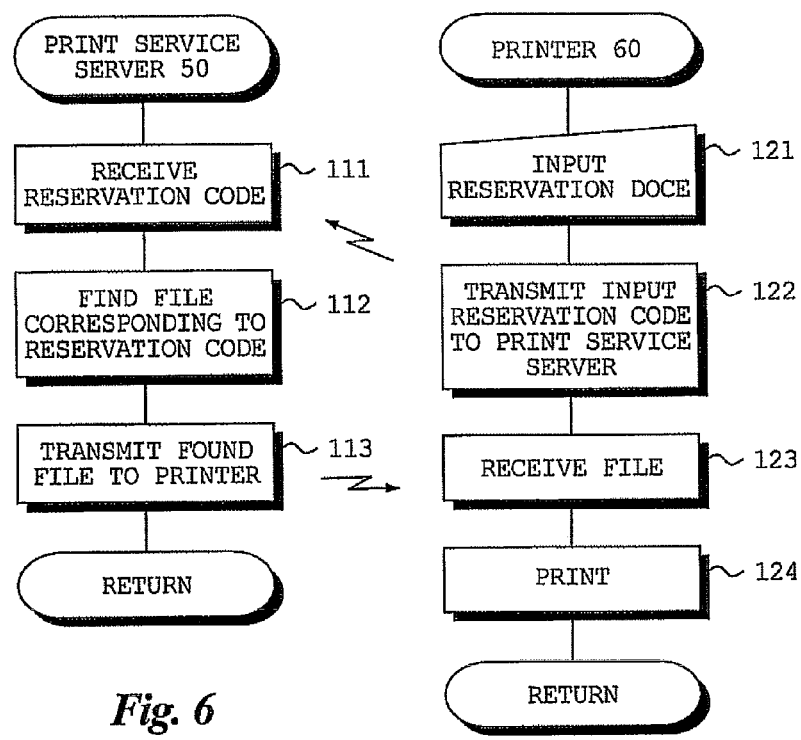
FIG. 6 is a flowchart illustrating processing executed by a print service server and a printer.

FIG. 6 is a flowchart illustrating processing executed by the print service server 50 and printer 60.

The user of the mobile telephone 1 goes to the convenience store where the printer 60 is located and inputs the reservation code to the printer 60 (step 121). In response, the entered reservation code is transmitted from the printer 60 to the print service server 50 (step 122).

Upon receiving the reservation code transmitted from the printer 60 (step 111), the print service server 50 finds the file that has been stored in the print service server 50 in correspondence with the received reservation code (step 112). The file found is transmitted from the print service server 50 to the printer 60 (step 113).

When the file transmitted from the print service server 50 is received by the printer 60 (step 123), the latter prints the contents represented by the received file (step 124). The user is thus capable of obtaining the printout.

Thus, in a system in which a print service is performed using the print service server 50 and the printer 60 in the manner described above, the file name data is transmitted from the mobile telephone 1 and the contents of the file having the file name represented by this file name data can be printed by the printer 60. Since the mobile telephone 1 need only transmit the file name data and not the file, the data traffic through the mobile telephone is reduced.

Figure 7:
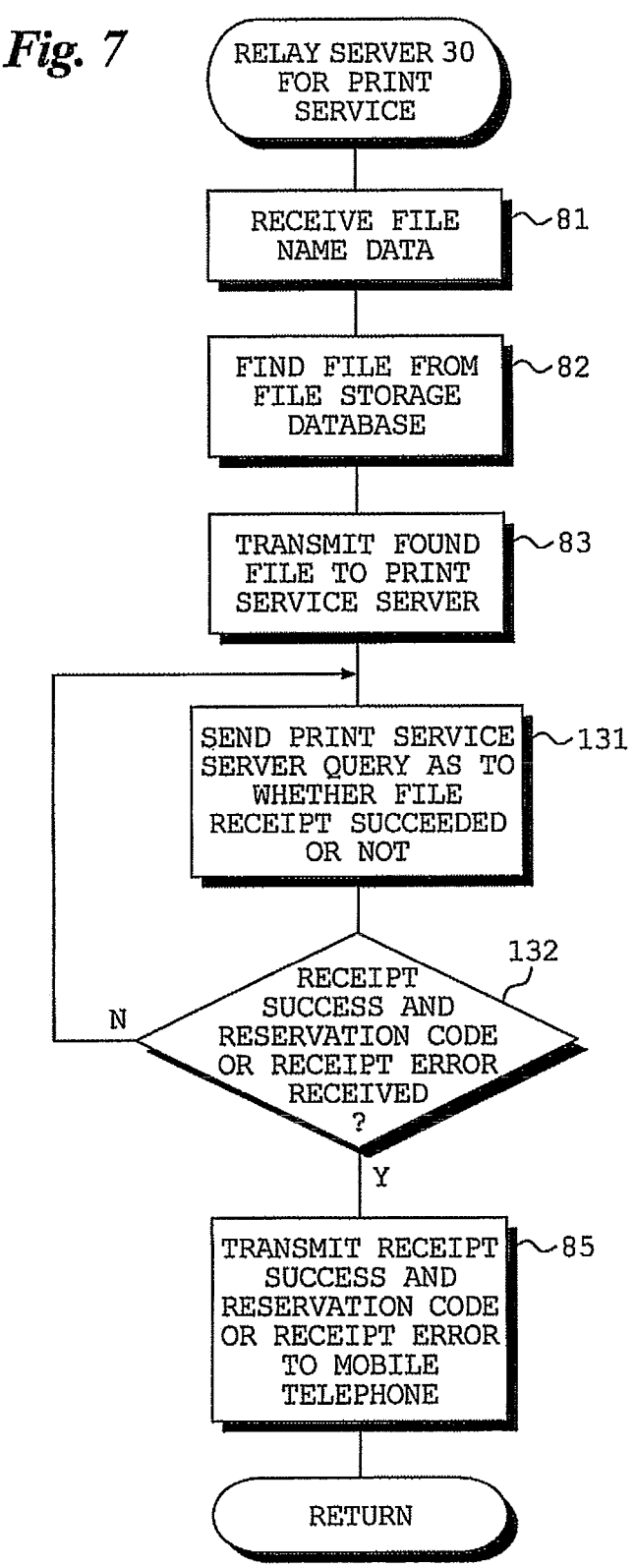
FIG. 7 is a flowchart illustrating processing executed by a relay server for a print service according to a second embodiment of the present invention.

FIG. 7 is a flowchart illustrating processing executed by the relay server 30 for the print service according to a second embodiment of the present invention. Processing steps in FIG. 7 identical with those shown in FIG. 4 are designated by like processing steps and need not be described again.

As described above, when a file is transmitted from the relay server 30 for the print service to the print service server 50 (step 83), a query command which inquires as to whether receipt of the file succeeded or not is transmitted from the relay server 30 to the print service server 50 (step 131). This query command is repeated every ten seconds, for example, until the receipt-success data and reservation code or the receipt error from the print service server 50 is received (step 132). Since the relay server 30 for the print service makes the inquiry and not the mobile telephone 1, an increase in data traffic through the mobile telephone 1 can be prevented even if the number of times the inquiry is made increases.

FIGS. 8 to 11C illustrate a third embodiment of the present invention. In this embodiment, the receipt-success data and reservation code or the receipt error is transmitted to the mobile telephone 1 using e-mail.

FIG. 8 is an example of a user information table.

The user information table stores user-related information. This table has been stored in the relay server 30 for the print service. Stored in the user information table are user IDs, names, mail addresses and terminal IDs (terminal IDs of mobile telephones).

FIG. 9 is an example of a reservation information table.

Stored in the reservation information table are reservation codes, subscriber IDs, document file names and reservation results. Although the reservation codes are indicated as numerals in order to facilitate comprehension, it goes without saying that complicated numerals, characters and symbols are used in order to prevent unauthorized inputs from third parties. User IDs are employed as the subscriber IDs. The subscriber ID is ascertained from the user ID and the mail address of the subscriber can be determined. The reservation information table also has been stored in the relay server 30 of the print service.

Figure 10:
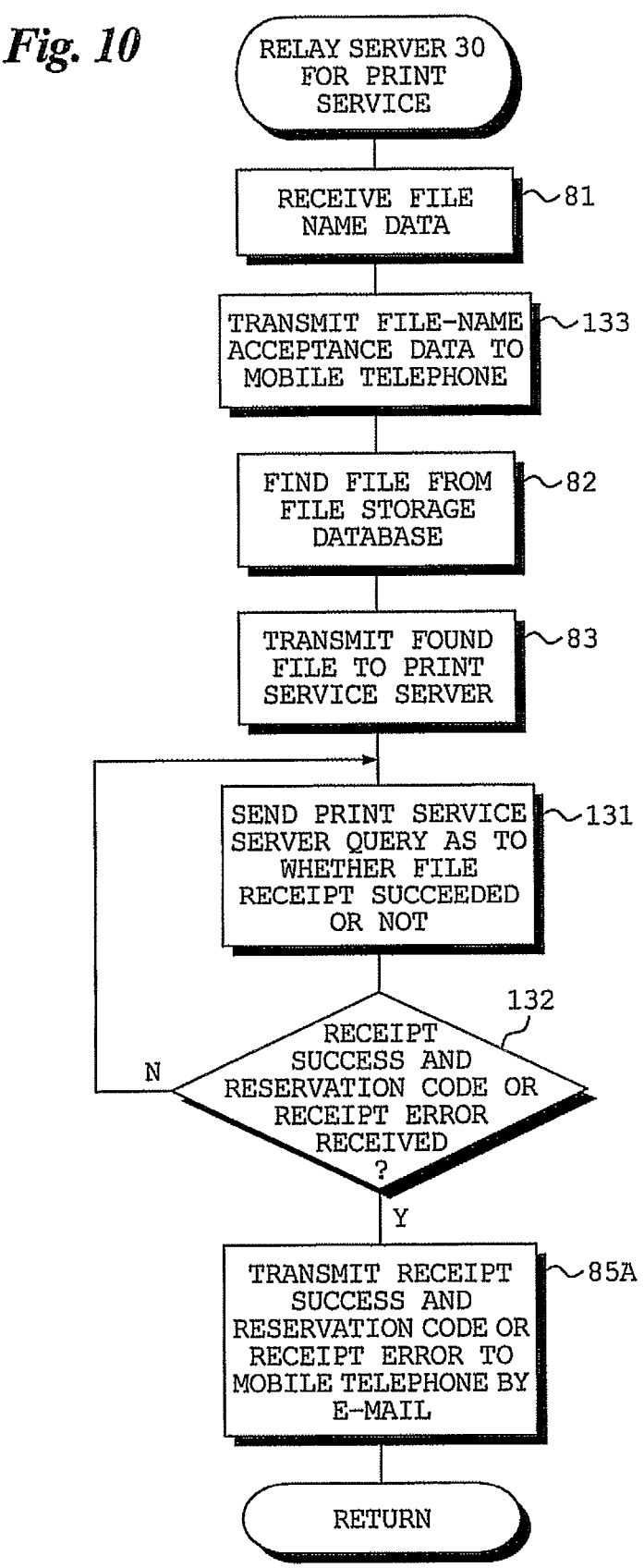
FIG. 10 is a flowchart illustrating processing executed by a relay server for a print service according to the third embodiment.
Figure 11:
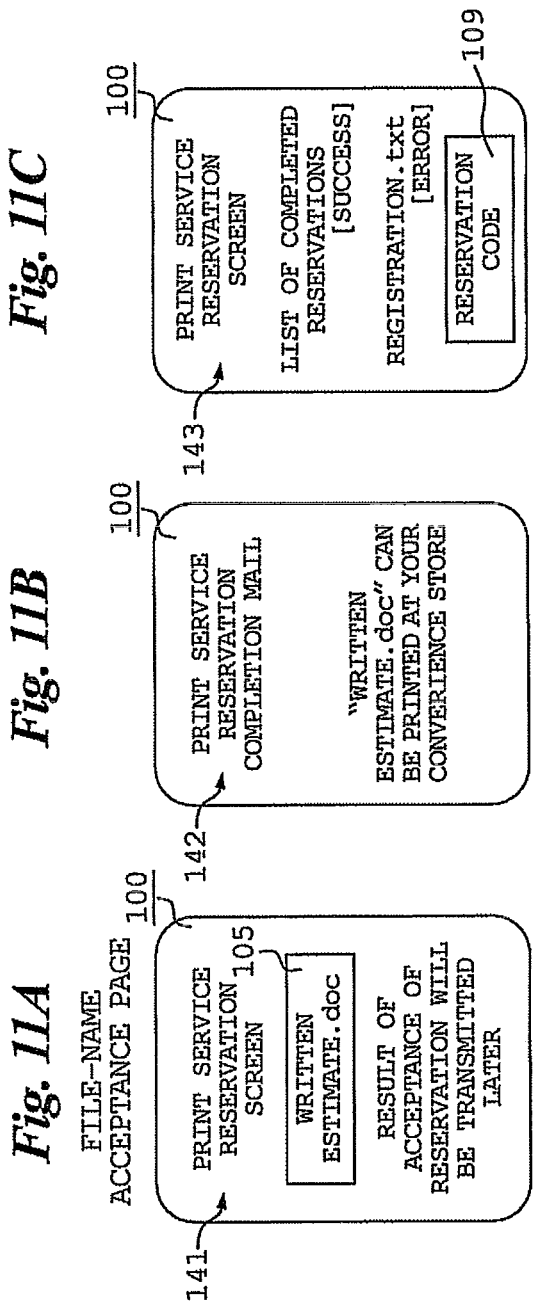
FIGS. 11A to 11C are examples of images displayed on the display screen of a mobile telephone according to the third embodiment.

FIG. 10 is a flowchart illustrating processing executed by the relay server 30 of the print service. Processing steps in FIG. 10 identical with those shown in FIG. 7 are designated by like processing steps and need not be described again. FIGS. 11A to 11C are examples of images displayed on the display screen of the mobile telephone 1.

When file name data is received from the mobile telephone 1 (step 81), as described above, file-name acceptance data is transmitted from the relay server 30 to the mobile telephone 1 (step 133). In response, a file-name acceptance page 141 is displayed on the display screen of the mobile telephone 1.

FIG. 11A is an example of the file-name acceptance page 141.

The reserved file name display area 105 is displayed substantially at the central portion of the file-name acceptance page 141. A character string notifying of the fact that a reservation has been made (that file name data has been received) is displayed below the reserved file name display area 105.

With reference again to FIG. 10, when the receipt-success data and reservation code or the receipt error transmitted from the print service server 50 is received by the relay server 30 for the print service ("YES" at step 132), a mail address is found from the reservation information table and user information table and the received receipt-success data and reservation code or the receipt error is transmitted to the found mail address by e-mail (step 85A).

FIG. 11B illustrates the contents of e-mail transmitted from the relay server 30. A character string 142 indicating that printing has been reserved is displayed by e-mail.

When the file name data is received by the relay server 30 for the print service, the file-name acceptance data is transmitted from the relay server 30 to the mobile telephone 1. This means that the user of the mobile telephone 1 can tell that the file name data has been transmitted to the relay server 30. Thereafter, receipt-success data, etc., is transmitted from the relay server 30 to the mobile telephone 1 by e-mail. Accordingly, it is unnecessary to connect the mobile telephone 1 to the relay server 30 from transmission of the file name data to receipt of the receipt-success data, etc.

FIG. 11C is an example of a print-reservation list display page 143.

The page 143 is displayed on the mobile telephone 1 by clicking the character string 103 "PRINT SERVICE RESERVATION LIST" on the print service page shown in FIG. 5A. When the character string 103 is clicked, data indicating this fact and data indicating the terminal ID is transmitted from the mobile telephone 1 to the relay server 30 for the print service. When this is done, the user ID is found from the terminal ID using the user information table and the reservation information table in the relay server 30, and the reserved file name and the result of reservation are read from the user ID found. Data representing the read file name and data representing the result of reservation is transmitted from the relay server 30 to the mobile telephone 1, whereby a print service reservation list screen page 143 is displayed.

The file name whose reservation has been completed and the result of the reservation are displayed on the print service reservation list screen page 143. Further, the reservation code area 109 is displayed at the bottom of the display screen 100. By pressing the reservation code area 109, the reservation code regarding the file whose reservation has succeeded is displayed.

Figure 12:
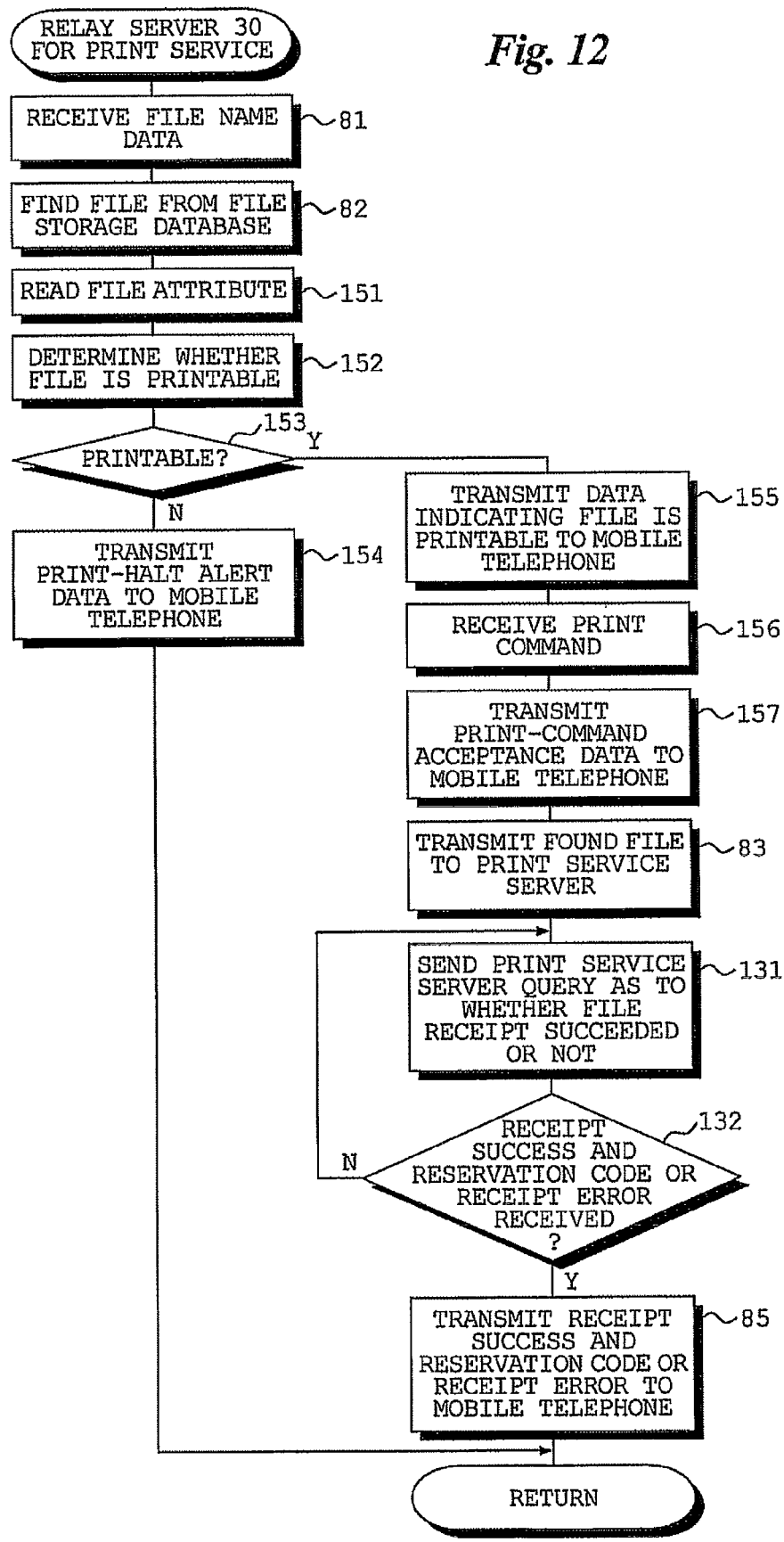
FIG. 12 is a flowchart illustrating processing executed by a relay server for a print service according to a fourth embodiment of the present invention.

FIG. 12 and FIGS. 13A, 13B illustrate a fourth embodiment of the present invention.

FIG. 12 is a flowchart illustrating processing executed by the relay server 30 for the print service. Processing steps in FIG. 12 identical with those shown in FIG. 10 are designated by like processing steps and need not be described again. FIGS. 13A and 13B are examples of a reservation confirmation page displayed on the display screen of the mobile telephone 1.

In a case where the print service server 50 and printer 60 are used to perform printing, there are instances where there is a limitation upon the format and amount of data of a utilizable file. Contents of a file that falls under this limitation cannot be printed. In this embodiment, such a file is not transmitted from the relay server 30 to the print service server 50.

When a file is found from the file storage database 40 (step 82) in the manner described above, the attribute of the file is read from the header of the file (step 151). Based upon the read attribute of the file, it is determined whether the file is printable by the print service server 50 and printer 60 (step 152). It goes without saying that attributes (formats and data quantities, etc.) of files that are printable by the print service server 50 and printer 60 have been stored in the relay server 30 for the print service, and that whether a file is printable or not is determined based upon the stored file attributes and the attribute of the file contained in the header of the read file.

If the file is printable ("YES" at step 153), data informing of the fact that the file is printable is transmitted from the relay server 30 to the mobile telephone 1 (step 155). If the file is not printable ("NO" at step 153), then print-halt alert data is transmitted from the relay server 30 to the mobile telephone 1 (step 154).

FIG. 13A is an example of a reservation confirmation page 161 displayed on the display screen of the mobile telephone 1 in a case where the data informing that printing is possible has been transmitted from the relay server 30. The reserved file name display area 105 is displayed substantially at the center. A print area 162 is displayed below the reserved file name display area 105. The print area 162 is capable of being pressed if the data informing that printing is possible has been transmitted from the relay server 30.

FIG. 13B is an example of the reservation confirmation page 161 displayed on the display screen of the mobile telephone 1 in a case where the print-halt alert data has been transmitted from the relay server 30. The print area 162 being displayed below the reserved file name display area 105 cannot be pressed (the fact that it cannot be pressed is indicated by the hatching).

If printing is possible and the print area 162 is pressed, a print command is transmitted from the mobile telephone 1 to the relay server 30 for the print service.

With reference again to FIG. 12, when the print command transmitted from the mobile telephone 1 is received by the relay server 30 (step 156), print-command acceptance data is transmitted from the relay server 30 to the mobile telephone 1 (step 157).

Since a printable file is transmitted to the print service server 50, unnecessary transmissions can be prevented.

Figure 15A:
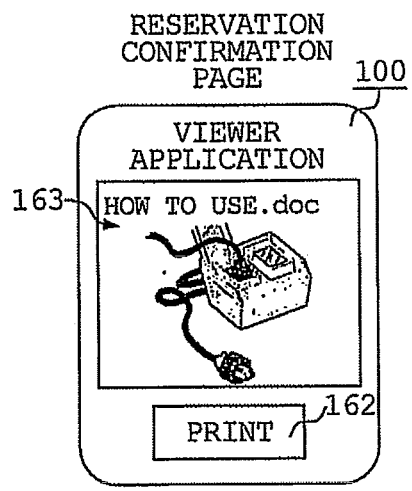
FIGS. 15A and 15B are examples of images displayed on the display screen of a mobile telephone according to the fifth embodiment.
Figure 15B:
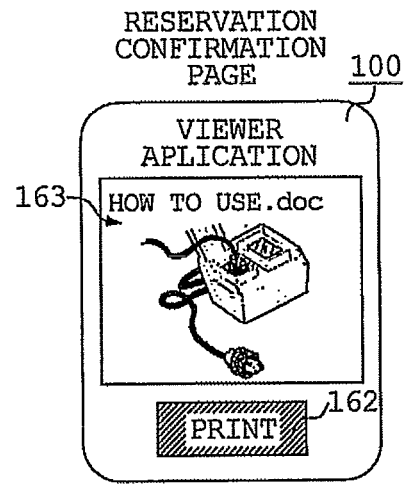

FIG. 14 and FIGS. 15A, 15B illustrate a fifth embodiment of the present invention. This embodiment concerns a case where contents represented by a file are displayed on the display screen of the mobile telephone 1.

FIG. 14 illustrates an example of control information. Here line numbers are furnished in order to facilitate comprehension.

The control information halts or permits printing of the contents of the file displayed on the display screen 100 of mobile telephone 1. Line 1 and line 9 indicate control information, and lines 2 to 5 indicate information regarding a file. Line 3 indicates the file name and line 4 the file data quantity. Lines 6 to 8 indicate whether printing is permitted or not. On line 7, "true" indicates that printing is permitted. If line 7 is "false", this means that printing is not permitted.

When a file and control information are transmitted from the relay server 30 to the mobile telephone 1, a reservation confirmation page illustrated in FIG. 15A or 15B is displayed on the display screen 100 of the mobile telephone 1.

FIG. 15A is an example of a reservation confirmation page in a case where data informing of the fact that printing is possible is transmitted to the mobile telephone 1 (a case where the control information indicates that printing is permitted).

In FIG. 15A, the image represented by the file is displayed together with the file name on a reservation confirmation page 163. The print area 162 is formed below this image. The print area 162 is capable of being pressed. A print command is transmitted from the mobile telephone 1 to the relay server 30 by pressing the print area 162.

FIG. 15B is an example of a reservation confirmation page in a case where print-halt alert data is transmitted to the mobile telephone 1 (a case where the control information indicates that printing is not permitted).

In FIG. 15B, the image represented by the file is displayed together with the file name on a reservation confirmation page 163. The print area 162 is formed below this image. The print area 162 is not capable of being pressed (the fact that it cannot be pressed is indicated by the hatching).

Figure 16:
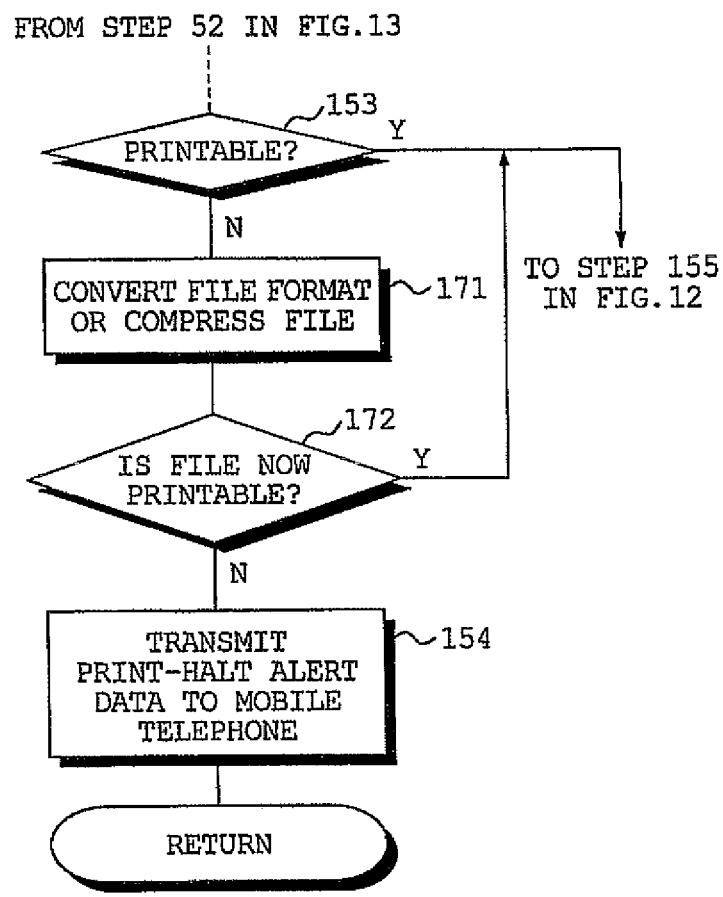
FIG. 16 is a flowchart illustrating a portion of processing executed by a relay server for a print service according to a sixth embodiment of the present invention.

FIG. 16 illustrates a portion of processing executed by the relay server 30 for the print service according to a sixth embodiment of the present invention.

If a file that cannot be printed using the print service server 50 and the printer 60 has been read from the file storage database 40 ("NO" at step 153) as described above, file-format conversion or file compression, etc., is carried out in such a manner that the file can be printed (step 171). If printing has been made possible using the print service server 50 and printer 60 owing to a format conversion [conversion to a format that is based upon the JPEG (Joint Photographic Experts Group) standard] or file compression (reduction in quantity of data) ("YES" at step 172), then the data informing that printing is possible is transmitted from the relay server 30 to the mobile telephone 1. If the file cannot be printed even if a format conversion or file compression is performed ("NO" at step 172), then the print-halt alert data is transmitted from the relay server 30 to the mobile telephone 1 (step 154).

As many apparently widely different embodiments of the present invention can be made without departing from the spirit and scope thereof, it is to be understood that the invention is not limited to the specific embodiments thereof except as defined in the appended claims.

What is claimed is:

1. A relay server for a print service, comprising:
   a file name data receiving device for receiving file name data transmitted from a user terminal device and representing a file name;
   a file detecting device for finding a file, which has the file name represented by the file name data received by said file name data receiving device, from within a file storage database;
   a file transmitting device for transmitting the file detected by said file detecting device to a print service server that is incapable of accessing the file storage database, said print service server transmitting the received file to a printer and causing the printer to print contents represented by the file;
   a print reservation code receiving device for receiving a print reservation code transmitted from the print service server in response to transmission of the file to the print service server by said file transmitting device; and
   a print reservation code transmitting device for transmitting the print reservation code, which has been received by said print reservation code receiving device, to the user terminal device.

2. The relay server according to claim 1, further comprising a query command transmitting device, responsive to transmission of the file to the print service server by said file transmitting device, for transmitting a query command, which inquires as to whether receipt of the file succeeded or not, to the print service server until the print reservation code is received by said reservation code receiving device.

3. The relay server according to claim 1, further comprising an acceptance data transmitting device for transmitting acceptance data, which indicates receipt of the file name data, to the user terminal device in response to receipt of the file name data by said file name data receiving device.

4. The relay server according to claim 1, further comprising:
   a determination device for determining whether contents represented by the file detected by said file detecting device cannot be printed in the printer utilizing the print service server;
   a file transmission halting device, responsive to a determination by said determination device that the contents cannot be printed, for halting transmission of the file to the print service server by said file transmitting device; and
   a print-halt alert data transmitting device, responsive to a determination by said determination device that the contents cannot be printed, for sending the user terminal device data indicating that printing has been halted.

5. The relay server according to claim 1, further comprising:
a file format determination device for determining whether format of the file detected by said file detecting device cannot be printed in the printer utilizing the print service server; and
a format converting device, responsive to a determination by said file format determination device that the format cannot be printed, for converting the format of the file detected by said file detecting device to a format that can be printed in the printer utilizing the print service server;
wherein file transmitting device sends the print service server a file having the format to which the conversion has been made by said format converting device.

6. The relay server according to claim 1, further comprising:
a data-quantity determination device for determining whether data quantity of the file detected by said file detecting device is so great that it cannot be printed in the printer utilizing the print service server; and
a data-quantity reducing device, responsive to a determination by said data-quantity determination device that the data quantity is so great that it cannot be printed, for reducing the data quantity of the file detected by said file detecting device to a data quantity capable of being printed in the printer utilizing the print service server;
wherein said file transmitting server sends the print service server a file having a data quantity the quantity of which has been reduced by said data-quantity reducing device.

7. A method of controlling a relay server for a print service, comprising:
receiving by the relay server, file name data transmitted from a user terminal device and representing a file name; and
utilizing a computer processor to cause the relay server to:
find a file, which has the file name represented by the received file name data, from within a file-storage database,
transmit the file to a print service server that is incapable of accessing the file-storage database, the print service server transmitting the received file to a printer and causing the printer to print contents represented by the file,
receive a print reservation code transmitted from the print service server in response to the transmission of the file to the print service server, and
transmit the received print reservation code to the user terminal device.

8. A computer-readable storage medium on which is embodied a computer program for controlling a relay server for a print service, the program comprising instructions which, when executed by a computer processor, cause the relay server to:
receive file name data transmitted from a user terminal device and representing a file name;
find a file, which has the file name represented by the file name data received, from within a file storage database;
transmit the file to a print service server that is incapable of accessing the file storage database, said print service server transmitting the received file to a printer and causing the printer to print contents represented by the file;
receive a print reservation code transmitted from the print service server in response to the transmission of the file to the print service server; and
transmit the received print reservation code to the user terminal device.

* * * * *